(12) United States Patent
Long

(10) Patent No.: US 12,266,260 B2
(45) Date of Patent: Apr. 1, 2025

(54) CROSSWALK SAFETY AND REPORTING SYSTEM

(71) Applicant: Louis Long, Kissimmee, FL (US)

(72) Inventor: Louis Long, Kissimmee, FL (US)

(*) Notice: Subject to any disclaimer, the term of this patent is extended or adjusted under 35 U.S.C. 154(b) by 68 days.

(21) Appl. No.: 18/198,786

(22) Filed: May 17, 2023

(65) Prior Publication Data
US 2023/0377454 A1 Nov. 23, 2023

Related U.S. Application Data

(60) Provisional application No. 63/343,373, filed on May 18, 2022.

(51) Int. Cl.
| | |
|---|---|
| *G08G 1/095* | (2006.01) |
| *G06V 20/54* | (2022.01) |
| *G06V 20/62* | (2022.01) |
| *G06V 40/10* | (2022.01) |
| *G06V 40/20* | (2022.01) |
| *G08G 1/005* | (2006.01) |
| *G08G 1/017* | (2006.01) |
| *G08G 1/04* | (2006.01) |

(52) U.S. Cl.
CPC ............ *G08G 1/005* (2013.01); *G06V 20/54* (2022.01); *G06V 20/625* (2022.01); *G06V 40/10* (2022.01); *G06V 40/25* (2022.01); *G08G 1/017* (2013.01); *G08G 1/04* (2013.01)

(58) Field of Classification Search
CPC .......... G08G 1/005; G08G 1/017; G08G 1/04; G08G 1/095; G06V 20/54; G06V 20/625; G06V 40/10; G06V 40/25
See application file for complete search history.

(56) References Cited

U.S. PATENT DOCUMENTS

| 10,424,194 | B2* | 9/2019 | Jung | E01F 15/003 |
|---|---|---|---|---|
| 10,431,076 | B2* | 10/2019 | Jung | G08G 1/0116 |
| 2015/0084791 | A1* | 3/2015 | Jang | G08G 1/07 340/944 |
| 2018/0025633 | A1* | 1/2018 | Tate | G08G 1/087 340/925 |

(Continued)

FOREIGN PATENT DOCUMENTS

KR  20190030316 A  *  3/2019

*Primary Examiner* — Toan N Pham
(74) *Attorney, Agent, or Firm* — Jason T. Daniel, Esq.; Daniel Law Offices, P.A.

(57) ABSTRACT

A crosswalk safety system includes a plurality of cameras that are positioned along a crosswalk lane. Each of the cameras are positioned and oriented to capture the front and rear license plate of a motor vehicle traversing the crossing lane, and a pedestrian walking along the crossing lane. A tower is provided and functions to support a plurality of warning lights, a digital sign, a strobe detector, and a pair of user interfaces. A vehicle detection sensor is positioned adjacent to the crosswalk lane. Each of the system components are connected to a central controller which selectively activates the lights, sign and cameras upon receiving an instruction from one or each of the vehicle detection sensor, the strobe detector or the user interfaces. Audiovisual information captured by the cameras is sent by the controller to a platform provider interface which is in communication with a government agency interface device.

11 Claims, 3 Drawing Sheets

(56) References Cited

U.S. PATENT DOCUMENTS

2022/0319316 A1* 10/2022 Sakurada ......... G08G 1/096783
2023/0316906 A1* 10/2023 Kirillov ................... G08G 1/09
340/907

* cited by examiner

CROSSWALK SAFETY AND REPORTING SYSTEM

CROSS-REFERENCE TO RELATED APPLICATIONS

This application claims the benefit of U.S. Application Ser. No. 63/343,373 filed on May 18, 2022, the contents of which are incorporated herein by reference.

TECHNICAL FIELD

The present invention relates generally to pedestrian and traffic safety systems, and more particularly to a safety and reporting system for use with pedestrian crosswalks on streets used by motor vehicles.

BACKGROUND

The statements in this section merely provide background information related to the present disclosure and may not constitute prior art.

Current pedestrian crosswalk designations are inadequate for many locations and lighting conditions. For example, most crosswalks utilize stripes that are painted on the surface of the pavement to warn drivers that they are entering a designated crossing area for pedestrians. Unfortunately, it is not uncommon for such markers to go unseen by drivers due to poor road conditions, bad weather, or inattention by the driver. For this reason, some high traffic crossing areas are augmented with active warning systems such as flashing lights, for example. Although useful, for their intended purpose, a large percentage of drivers who still pass through crosswalk areas at an unsafe speed and/or fail to yield to pedestrians still remains.

Accordingly, it would be beneficial to provide a crosswalk safety and reporting system that can function to capture audiovisual evidence of vehicles and pedestrians within a designated crosswalk area so as to allow a government agency to determine and/or ticket drivers for moving violations. Moreover, it would be beneficial to provide a system that can provide audiovisual evidence in the event that a pedestrian is injured by a vehicle at a crosswalk location.

SUMMARY OF THE INVENTION

The present invention is directed to a crosswalk safety system. One embodiment of the present invention can include a plurality of cameras that are positioned along a crosswalk lane. Each of the cameras can be positioned and oriented to capture the front and rear license plate of a motor vehicle traversing the crossing lane, and a pedestrian walking along the crossing lane. A tower can be provided having a plurality of warning lights, a digital sign, a strobe detector, and a pair of user interfaces. A vehicle detection sensor can be positioned adjacent to the crosswalk lane.

Each of the system components can be connected to a central controller which can selectively activate the lights, signs and cameras upon receiving an instruction from one or both of the vehicle detection sensors, the strobe detector or the user interfaces. Audiovisual information captured by the cameras can be stored in the controller and sent to a platform provider interface. The platform provider interface can include functionality for determining if an accident or unsafe incident has occurred and can send the audiovisual evidence to a government agency interface device.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the terms "audiovisual data" shall be used to describe images, sounds video and other such information captured by the system components which documents a pedestrian or vehicle encounter with the crosswalk.

The term "Government Agency" shall be used to describe any agency, group or entity authorized by the government to receive audiovisual data from the system and to make a determination on whether a law has been broken. In some instances, the same agency may be responsible for issuing a ticket or dispatching police; however, other embodiments are contemplated wherein this action is performed by another authorized agency. Several nonlimiting examples of a government agency include but are not limited to state or local police departments, county ordinance, state or local governance boards, and code enforcement, for example.

The term "platform provider" is used to describe the individual, group or legal entity that is overseeing the below described methodology, providing system components such as the crosswalk system, and/or performing or overseeing various aspects of the below described system and method steps.

Figure 1:
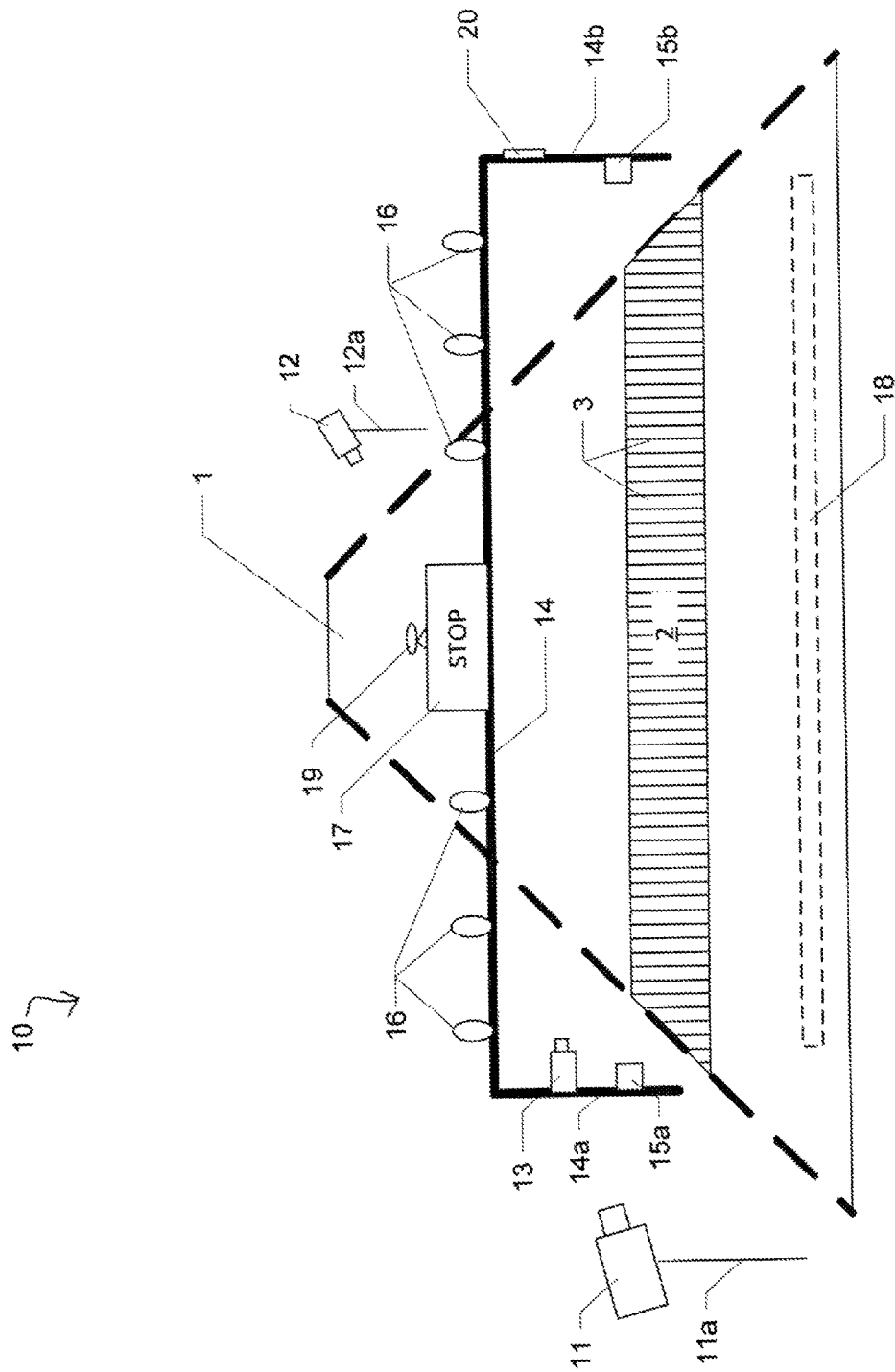
FIG. 1 is a perspective view of a crosswalk safety and reporting system that is useful for understanding the inventive concepts disclosed herein.
Figure 2:
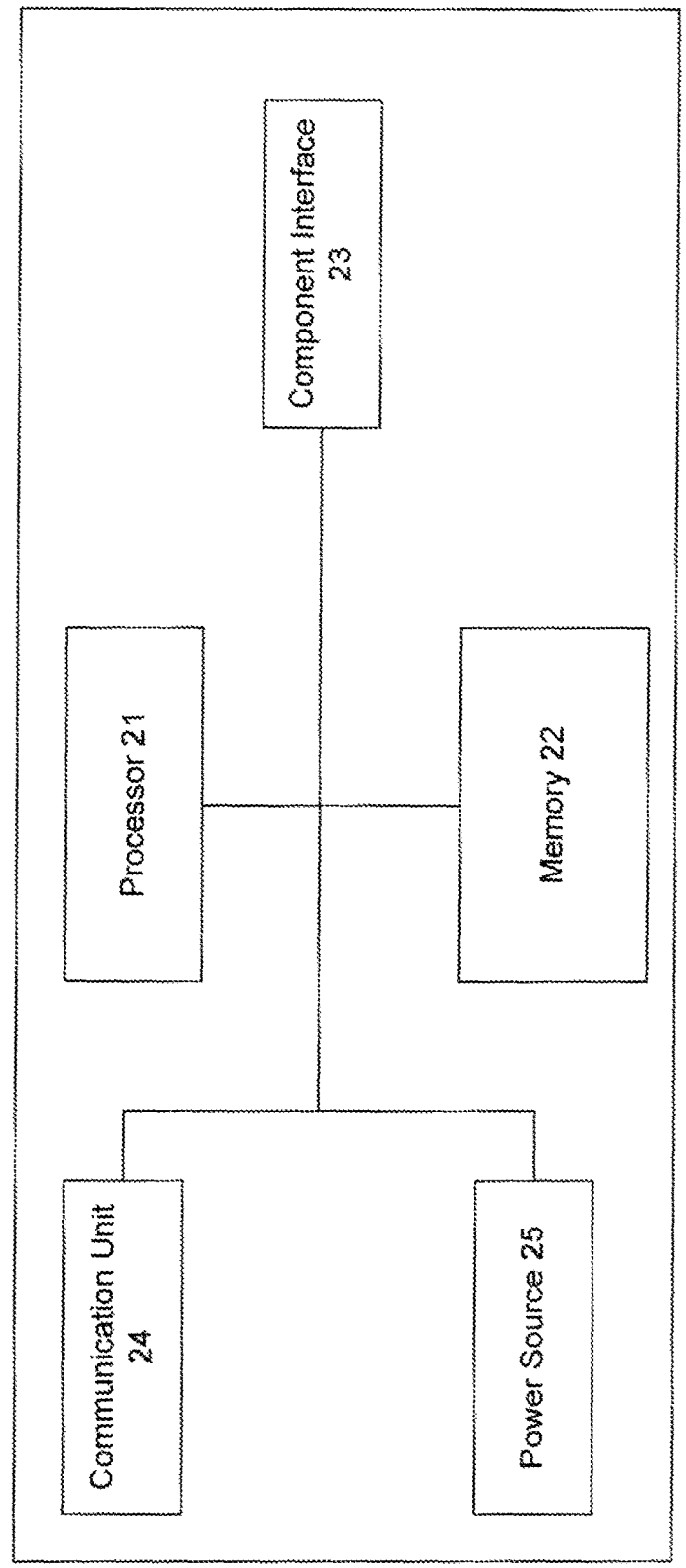
FIG. 2 is a simplified block diagram of the controller of the crosswalk safety and reporting system, in accordance with one embodiment of the invention.
Figure 3:
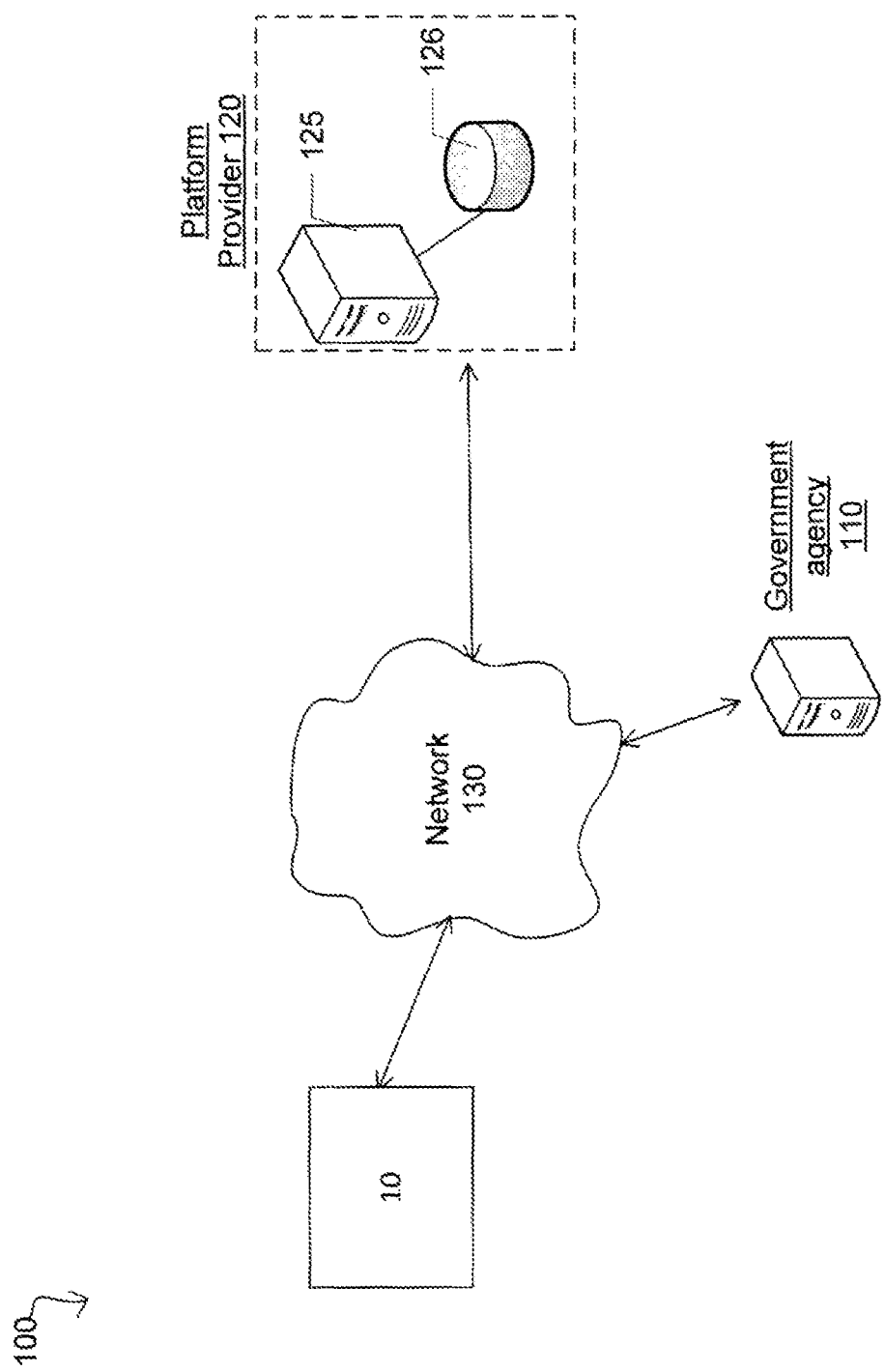
FIG. 3 is an exemplary operating environment for the crosswalk safety and reporting system, in accordance with one embodiment of the invention.

FIGS. 1-3 illustrate one embodiment of a crosswalk safety and reporting system 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 illustrates one embodiment of the crosswalk safety and reporting system 10 that is installed along a road 1 having a designated crosswalk lane 2 that is provided with high visibility markings 3. As shown, the system 10 can include a plurality of cameras 11, 12 and 13, a pair of crosswalk access buttons 15a and 15b, a plurality of lights 16, a sign 17, a vehicle detection sensor 18 and a strobe detector 19 that are in communication with a central controller 20.

As described herein, each of the plurality of cameras 11, 12 and 13 can include, comprise or consist of any type of image capture device capable of recording still or moving images in any one of the visible, near-infrared, or any appropriate spectrum, and may utilize a CCD (charge-coupled device) or CMOS (complementary metal-oxide semiconductor) imaging sensors, for example. Additionally, each image capture device can incorporate any number of known focusing lenses including a short or wide field-of-view lens to capture images that are proximately located near the device.

In various embodiments, one or more of the cameras may be equipped with sound capturing components such as a microphone so as to capture sounds. In either instance, each of the cameras are connected to the below controller 20 and function to send captured audiovisual information to the controller via one or both of a hardwire or wireless connection.

In the preferred embodiment, each of the cameras 11-13 can be mounted and positioned at specific locations relative to the crosswalk lane 2 so as to capture specific information. In one embodiment, cameras 11 and 12 can be specifically positioned so as to capture front and back images of vehicles crossing the crosswalk lane 2. In the preferred embodiment, these cameras will be positioned on either end of the crosswalk lane 2 and will be oriented diagonally to the lane, so as to capture the front and back license plates of a vehicle driving across the crosswalk area in either direction. To this end, each of the cameras may be mounted onto existing infrastructure such as utility poles, for example, or may be provided with designated poles 11a and 12a so as to position the cameras in the described locations.

In one embodiment, camera 13 can be specifically oriented so as to capture the complete and total movements of pedestrians as they approach and traverse the crosswalk lane 2. In the preferred embodiment, camera 13 can be secured onto the below described tower and can be oriented in line with the crosswalk lane.

Although described above as including three cameras, at specific locations and orientations, other embodiments are contemplated wherein the cameras are located at different positions, such as along the top of the tower so as to be oriented toward either side of the crosswalk lane. Additionally, any number of other cameras may be provided at these or other locations so as to be oriented the same or differently than described above.

The tower 14 can function to provide a clearly visible series of components, to alert drivers of the presence of the crosswalk area and to allow the system components to capture the audiovisual information associated with vehicles crossing the area. In one embodiment, the tower can include a central crossbar section that is suspended above and parallel with the crosswalk lane 2 via a pair of tower legs 14a and 14b. In the preferred embodiment, the tower can include high visibility paint (preferably yellow) and/or any number of high visibility markings such as reflective tape and the like.

In one embodiment, a pair of user controls 15a and 15b such as the crosswalk push buttons, for example, can be provided along the tower legs on either side of the crosswalk lane 2. The controls can be used in the expected manner whereby pedestrians seeking to cross the road using the crosswalk lane 2 can depress the button to initiate the lights and other driver warning functions.

In one embodiment, a plurality of lights 16 can be disposed along the tower, preferably along the central crossbar section, and can be selectively activated by one or more of the system components. Depending on whether the system is deployed across a one-way street or a two-way street, each of the lights can be oriented in the same direction or in substantially opposite directions so as to face the direction of travel for vehicles passing under the tower.

Each of the lights can function to display any number of different colors and may operate in a continuous mode, a flashing mode or in any number of different patterns such as a chasing pattern, for example.

In one embodiment, a display screen 17 can be provided along the tower and can operate in conjunction with the lights. The display can function to provide any number of different messages to drivers such as SLOW DOWN, STOP or other such warnings. As described herein, each of the lights 16 and the display screen 17 can preferably be constructed from LED's so as to be highly visible and energy efficient, however any number of other components are also contemplated.

In one embodiment, a vehicle detection sensor 18 can be provided to independently detect the presence of a motor vehicle approaching the crosswalk lane. In the preferred embodiment, the vehicle sensor 18 can include one of a weight sensor, pressure sensor or magnetic sensor that is embedded within the road 1 and that mechanically detects the presence of an approaching vehicle. Of course, any number of other components may be provided as the vehicle sensor to allow the system to determine that a vehicle is approaching the crosswalk lane. Several nonlimiting examples can include a radar sensor that is positioned along or within the tower, or an image recognition module that works with the cameras to detect the presence of a vehicle, among others, for example.

In one embodiment, a strobe sensor 19, siren sensor or other such device can be provided along the tower 14. The strobe sensor can function to detect flashing lights or siren of an emergency vehicle such as a police car, firetruck or ambulance, for example, and report the same to the controller for selective activation of the system components.

The system controller 20 can function to control the operation of each of the system elements and can communicate with a government agency. In one embodiment, the controller 20 can include a processor 21 that is conventionally connected to a memory 22, a component interface 23, a communication unit 24, and a power source 25.

Although illustrated as separate elements, those of skill in the art will recognize that one or more system components may comprise or include one or more printed circuit boards (PCB) containing any number of integrated circuit or circuits for completing the activities described herein. Of course, any number of other analog and/or digital components capable of performing the below described functionality can be provided in place of, or in conjunction with the below described controller elements.

The processor 21 can be a conventional central processing unit (CPU) or any other type of device, or multiple devices, capable of manipulating or processing information such as program code stored in the memory 22 and for causing the circuitry to complete the activities and functionality described herein.

Memory 22 can act to store operating instructions in the form of program code for the processor 21 to execute, along with audiovisual data captured by the cameras 11-13. Although illustrated in FIG. 2 as a single component, memory 22 can include one or more physical memory devices such as, for example, local memory and/or one or more bulk storage devices. As used herein, local memory can refer to random access memory or other non-persistent memory device(s) generally used during actual execution of program code, whereas a bulk storage device can be implemented as a persistent data storage device such as a hard drive, for example, containing programs that permit the processor to perform the functionality described below. Additionally, memory 22 can also include one or more cache memories that provide temporary storage of at least some program code in order to reduce the number of times program code must be retrieved from the bulk storage device during execution. Each of these devices are well known in the art.

The component interface 23 can function to provide a communicative link between the processor 21 and the system components such as the cameras 11-13, the buttons 15a-15b, the plurality of lights 16, the display screen 17, the vehicle detection sensor 18 and the strobe sensor 19. In this regard, the component interface unit can include any number of different components such as one or more PIC microcontrollers, internal bus, external couplings such as receptacles for engaging communication cables connected to the system components, and/or local wireless transceivers such as WIFI, for example, capable of performing wireless communication with the system components 11-18. Of course, any other means for providing one or two-way communication between the controller 20 and the system components 11-18 can also be utilized herein.

The communication unit 24 can function to allow the system controller 20 to communicate with an external system being operated by a platform provider, a government agency or other such group. The communication unit can function to receive operating instructions from the external system and can send data such as audiovisual information captured by the cameras or diagnostic information to the external system. In this regard, the communication unit can include any number of components capable of sending and/or receiving electronic signals with an externally located device, either directly or over a network.

In one preferred embodiment, the communication unit can include a cellular transceiver for communicating wirelessly with the external system; however other embodiments are contemplated wherein the communication unit can include a coax or telephone cable and circuitry for communicating via hardwire connections.

The power source 25 can preferably include an A/C electrical power transformer and cord capable of allowing the controller and/or system components to be powered from an electrical outlet connected to a commercial power grid. Additionally, or alternatively, the power source may include a solar power unit having a battery bank, transformer and solar cells for operating the system when the commercial power is down or is not otherwise available.

FIG. 3 is a schematic illustration of an exemplary operating environment 100 for implementing the crosswalk safety and reporting system 10. In one embodiment, the operating environment 100 can include the above-described system 10, at least one government agency interface device 110, and a platform provider interface device 120 that are connected over a network 130.

The network 130 can be any type of network, including a cellular network, local area network ("LAN"), such as an intranet, a wide area network ("WAN"), the Internet, and/or any other type of data transmission and reception medium.

The government agency interface device 110 can be any type of computing device that is operable by a human user. A computing device refers to any device with a processor and memory that can execute instructions and communicate with another device. Computing devices include, but are not limited to, smartphones, tablet computers, personal computers, laptop computers and/or purpose-built machines that are pre-encoded with an application interface, so as to perform the functionality so described. In either instance, each of the computing devices can include one or more client applications, such as a conventional web browser, and/or an application interface, for example, which can allow the device to communicate with the platform provider interface device 120.

The platform provider 120, according to one embodiment, can include one or more individual computing devices 125 that can be connected to one or more databases 126 on which various portions of the below described methodology can be performed. The platform provider 120 can function to communicate with the government agency interface device through any number of different mediums such as a website, mobile application, secure application or email, for example. In this regard, one or more of the individual computing devices 125 can include various web servers, email servers, application database servers and so forth.

The database 126 can include any type of computer-readable storage mediums, including all forms of volatile and non-volatile memory such as, for example, semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD. The database can function to receive audiovisual information from the crosswalk system 10 and send the same to the government agency interface device along with other incident related information such as a timestamp or date stamp, for example.

In operation, the system 10 can be installed at any crosswalk location 2 where improved safety and/or accountability measures are desired. Once installed, the system can be activated in several manners to capture interactions between vehicles and pedestrians.

In a first example, the system can operate in a manual mode whereby upon detecting that a pedestrian has engaged one of the buttons 15a or 15b, the controller activates the cameras 11-13 to begin recording, and the lights 16 along with the sign 17 to become active for a set duration of time such as 1 minute for example. Upon expiration of the time period, the system components can go back to standby mode.

In a second example, the system can operate in an automatic mode whereby, upon detecting both the presence of a vehicle via the sensor 18, and the presence of a pedestrian via the pedestrian camera 13 or activation of the buttons 15a or 15b, the cameras will begin recording and the lights and sign will become active for a set period of time. In this example, if the components continue to detect the presence of a vehicle or pedestrian in the crosswalk lane, the timer will continuously reset, thus continuing the recording and active warnings.

In a third example, the system can function to operate the cameras to continuously record 24 hours a day. In this mode, the lights 16 and sign 17 can be activated in the same manner described above with regard to examples 1 and 2. Such a feature can beneficially allow police to monitor areas where the system is installed at all times.

In a fourth example, the system can function to automatically activate the cameras, lights and display upon detecting the presence of an emergency vehicle with active lights or siren. In this example, the sign will preferably state MOVE OVER FOR EMERGENCY VEHICLE or display other such warnings to both pedestrians and vehicles to clear the area to allow the emergency vehicle to pass through.

In either instance, the audiovisual information captured by the system 10 can be immediately or periodically sent to the platform provider 120 for storage within the database. In some instances, such as when an accident occurs or a vehicle fails to stop despite the activation of the crosswalk warning systems, the platform provider can send the audiovisual files associated with the incident to the government agency interface device so that the agency may issue a ticket or summons to the registered owner of the vehicle as determined by the license plate of the vehicle captured by the system.

Accordingly, the above-described system provides a novel solution for improving safety and accountability at crosswalks that is not rendered obvious by any known art.

As to a further description of the manner and use of the present invention, the same should be apparent from the above description. Accordingly, no further discussion relating to the manner of usage and operation will be provided.

As described herein, one or more elements of the device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A crosswalk safety system, comprising:
   a plurality of cameras that are positioned to capture audiovisual information of a crosswalk lane;
   at least one crosswalk interface that is positioned along one side of the crosswalk lane;
   a plurality of lights that are positioned adjacent to the crosswalk lane;
   an emergency vehicle sensor that is configured to detect one of an emergency vehicle siren or flashing strobe lights from the emergency vehicle;
   a pressure sensor that is configured to detect a vehicle approaching the crosswalk lane;
   a display screen; and
   a controller that is in communication with each of the plurality of cameras, the at least one crosswalk interface, the plurality of lights, the pressure sensor, the emergency vehicle sensor and the display screen,
   wherein the controller is configured to activate the cameras and the lights, and to play a first message on the display upon receiving a notification from the pressure sensor, and
   wherein the controller is configured to activate the cameras and the lights, and to play a second message on the display upon receiving a notification from the emergency vehicle sensor.

2. The system of claim 1, wherein the plurality of cameras includes a first camera that is positioned along one end of the crosswalk lane; and
   a second camera that is positioned along the opposite end of the crosswalk lane,
   wherein each of the first and second cameras are configured to capture one or a front license plate or a back license plate of a vehicle crossing the crossing lane.

3. The system of claim 2, wherein the plurality of cameras includes a third camera that is positioned in line with the crossing lane, said third camera being configured to capture a pedestrian walking an entire length of the crossing lane in a head on orientation.

4. The system of claim 1, further comprising:
   a tower having a crossbar that is oriented above and parallel to the crosswalk lane; and
   a pair of tower legs.

5. The system of claim 4, wherein each of the plurality of lights are positioned along the tower crossbar.

6. The system of claim 5, wherein each of the plurality of lights comprise Light emitting diodes.

7. The system of claim 4, wherein each of the at least one crosswalk interface comprises a first crosswalk interface and a second crosswalk interface,
   wherein the first crosswalk interface is mounted on one of the tower legs, and the second crosswalk interface is mounted on the other tower leg.

8. The system of claim 7, wherein each of the crosswalk interfaces comprise push button devices.

9. The system of claim 4, further comprising:
   a sign that is positioned along the tower.

10. A safety and reporting system, comprising:
    a crosswalk safety system that includes a plurality of cameras that are positioned to capture audiovisual information of a crosswalk lane, at least one crosswalk interface that is positioned along one side of the crosswalk lane, a plurality of lights that are positioned adjacent to the crosswalk lane, an emergency vehicle sensor that is configured to detect one of an emergency vehicle siren or flashing strobe lights from the emergency vehicle, a pressure sensor that is configured to detect a vehicle approaching the crosswalk lane, a display screen and a controller that is in communication with each of the plurality of cameras, the at least one crosswalk interface, the plurality of lights, the pressure sensor, the emergency vehicle sensor and the display screen; and
    a platform provider interface device that is in communication with the controller,
    wherein the controller is configured to activate the cameras and the lights, and to play a first message on the display upon receiving a notification from the pressure sensor,
    wherein the controller is configured to activate the cameras and the lights, and to play a second message on the display upon receiving a notification from the emergency vehicle sensor, and
    wherein the controller is configured to send audiovisual information captured by the activated cameras to the platform provider interface.

11. The system of claim 10 wherein the platform provider interface includes functionality for sending operating instructions to the controller, and sending the received audiovisual information to a third party device.

* * * * *